United States Patent [19]

Jenkins et al.

[11] Patent Number: 4,515,012
[45] Date of Patent: May 7, 1985

[54] VALVE TESTING SYSTEM UTILIZING AN ARTIFICIAL ATMOSPHERE

[75] Inventors: Patrick A. Jenkins, Decatur; Donald A. Ferguson, Dixon, both of Ill.

[73] Assignee: Borg-Warner Corporation, Chicago, Ill.

[21] Appl. No.: 555,091

[22] Filed: Nov. 25, 1983

[51] Int. Cl.³ ............................................. G01M 19/00
[52] U.S. Cl. ........................................ 73/168; 73/4 R
[58] Field of Search .................... 73/3, 4 R, 168, 198, 73/861.52, 119, 715, 861.47

[56] References Cited

U.S. PATENT DOCUMENTS

| | | | |
|---|---|---|---|
| 2,569,299 | 9/1951 | Fegel | 73/4 R |
| 3,045,470 | 7/1962 | Crandall et al. | 73/4 R |
| 4,050,298 | 9/1977 | Hope et al. | 73/121 |
| 4,050,299 | 9/1977 | Maxwell | 73/126 |
| 4,056,974 | 11/1977 | Klinger et al. | 73/92 |

*Primary Examiner*—Charles Frankfort
*Assistant Examiner*—Thomas B. Will
*Attorney, Agent, or Firm*—Florian S. Gregorczyk

[57] ABSTRACT

A test system for rapid and accurate testing of valves, especially delay valves for automotive applications, includes both an apparatus and test method. This test apparatus utilizes a reference pressure to avoid calculating a barometric adjustment to a measured flow rate through such delay valves.

10 Claims, 1 Drawing Figure

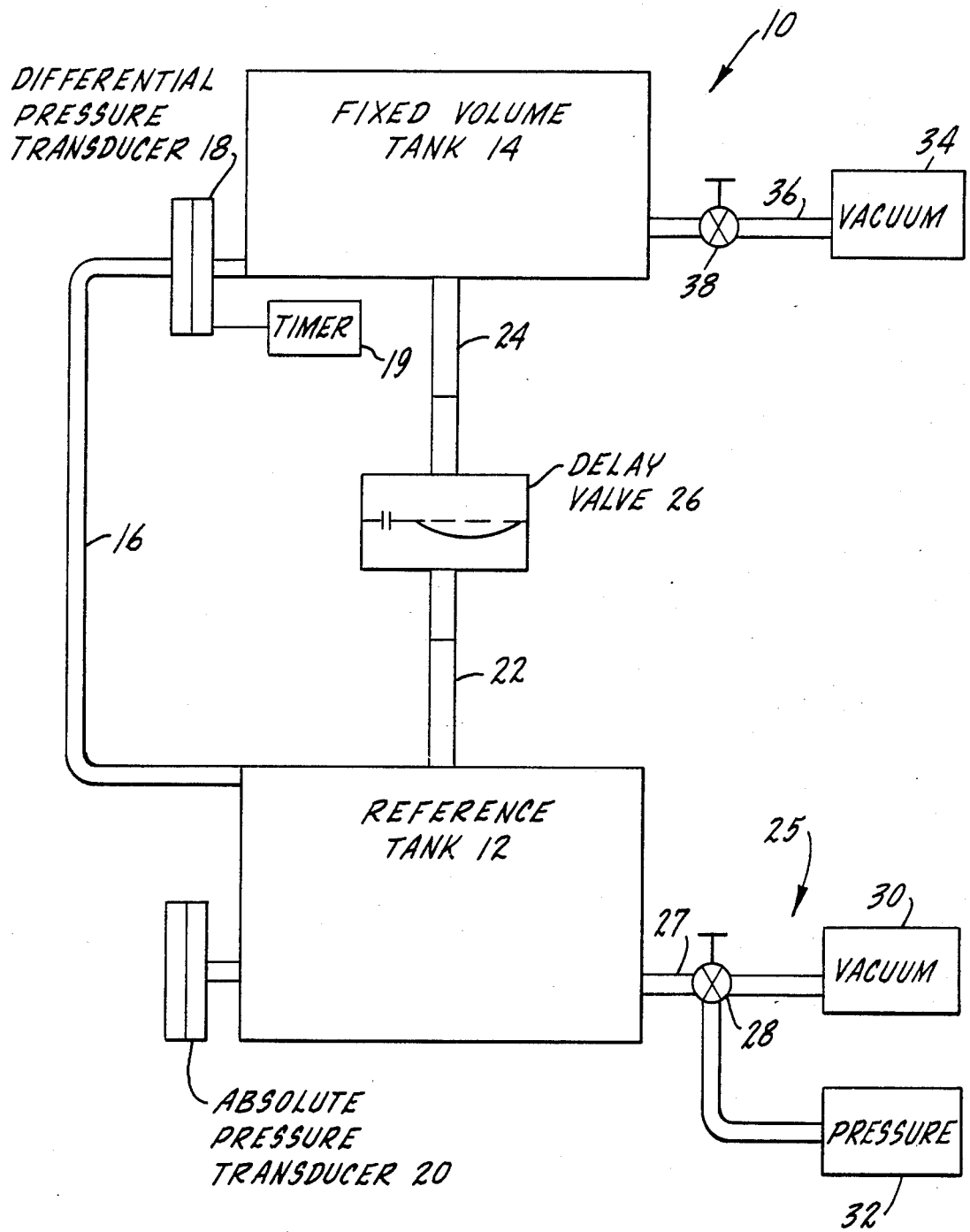

4,515,012

VALVE TESTING SYSTEM UTILIZING AN ARTIFICIAL ATMOSPHERE

BACKGROUND OF THE INVENTION

1. Field of the Invention

The invention relates generally to a system for rapidly and accurately analyzing a valve. More specifically a test stand and evaluation method is disclosed that analyzes delay valves for use in automotive applications, and moreover accomplishes the analysis at a rate sufficiently fast to make it practical on a high speed automotive production line. This procedure provides a consistent reference pressure which may be set at any desired or predetermined value.

2. Description of the Prior Art

Valves in general, and delay valves for the automotive industry in particular, frequently require calibration or measurement against a standard prior to use. This calibration procedure may utilize atmospheric pressure as a reference pressure. Atmospheric pressure is broadly a function of the altitude above sea level as well as climatic conditions which must be taken into account in any evaluation comparing calibration results. To accommodate this variation in pressure and to make the test results comparable to test results from other locales, a barometric correction formula is utilized. However, prior arrangements for testing with the attendant time for the compensation calculations to be completed are too slow for modern automotive manufacturing situations.

The use of a test stand with a test valve interposed between a pressure regulating valve and an exhaust valve is taught in U.S. Pat. No. 4,050,298 (Hope et al.). An apparatus for testing vehicle pneumatic braking systems is disclosed where a manual valve and a pressure gauge control the supply and exhaust of air to and from the vehicle braking system, and the accompanying variations in pressure in the pneumatic system are noted. There is no teaching of utilizing a reference pressure source nor a known fluid volume. Essentially this reference teaches a procedure to test a pressure tolerance or response to a pressure, not a rate of change at specific operating characteristics or parameters. This system utilizes two manually operable valves to test an operating (braking) system.

Other test apparatus interpose a test sample between a fixed condition or an operating simulation and a force or drive system. In U.S. Pat. No. 4,056,974 a test apparatus for materials or structural components is taught, which apparatus includes a pressure (hydraulic) operated load mechanism controlled by a servo-hydraulic control unit. Impliedly this is a mechanical fatigue test apparatus for the application of both static and dynamic loads to a test piece.

U.S. Pat. No. 4,050,299 illustrates a test stand for a brake testing method for a brake sensor. The test mechanism includes a driver roll and an idler roll having speed sensors associated therewith. The test technique induces a brake lock-up on the driver wheels to actuate the anti-skid system as well as simultaneously generating signals in response to the actuation of the anti-skid system by either sensor.

The above-cited prior art does not teach or disclose a system to analyze a delay valve. Further, none of the teachings illustrates the measurement of a flow-rate, that is the change of pressure with respect to time, through a valve interposed between a fluid of fixed volume and a fluid volume at a known or predetermined pressure. Such empirical flow measurement avoids the determination of flow rate with compensating factors in a mathematical equation. The use of a mathematical adjustment has historically delayed the determination of the flow rate and has demonstrated that such mathematical determinations can not wholly compensate for constantly changing climatic conditions.

SUMMARY OF THE INVENTION

The invention relates to a new and improved method and apparatus for testing delay valves. The method includes providing a known volume of fluid at a fixed pressure, another volume of fluid in a reference or artificial atmospheric pressure tank, a differential pressure transducer between these tanks, and provisions for coupling a delay valve in parallel with the differential pressure transducer. Separate operating means are coupled to each of the fixed or known volume of fluid and reference pressure tank to provide pressure or vacuum therein. Thereafter the reference pressure is preferably fixed at a pressure representative of atmospheric pressure at sea level, that is, approximately 29.92 inches of mercury.

The delay valve is mounted between the reference tank and the fixed volume. The pressure of the fixed volume fluid is changed until the pressure differential, as measured by the differential pressure transducer, between the fixed volume and reference tank reaches a predetermined value. The flow rate between the fixed volume and reference tank through the delay valve is determined by measuring the time to attain a predetermined change of pressure in the fixed volume. The use of a reference condition avoids the vagaries of climatic conditions such as is experienced by using atmospheric pressure as the reference pressure. Further, this invention avoids the need to calculate the actual flow rate by compensating for pressure-affecting variables. Rather this method and apparatus provides a means to directly read the flow rate.

DESCRIPTION OF THE DRAWING

The FIGURE is a diagrammatic illustration of the apparatus of the present invention.

DETAILED DESCRIPTION OF THE INVENTION

An improved method of testing delay valves includes a means to measure the actual flow rate through a valve under known conditions. The method is accomplished in a sequence of steps and utilizes an apparatus such as that illustrated in the FIGURE.

The FIGURE illustrates a test stand assembly 10 for testing delay valves. Test stand assembly 10 includes a first means or reference tank 12, a second means or fixed volume tank 14 and a conduit 16 communicating between reference tank 12 and fixed volume tank 14. A differential pressure transducer 18 with a timer 19 or time measurement apparatus is interposed in conduit 16 to monitor the pressure differential between the tanks 12, 14. Reference tank 12 is equipped with an absolute pressure transducer 20 to monitor its pressure prior to conducting a test of a delay valve. Reference tank 12 and fixed volume tank 14 have extensions 22 and 24, respectively, to receive connections from a delay valve 26 to be tested.

Fixed volume tank 14 communicates with a regulated fluid vacuum source 34 through a conduit 36. A first valve means, or on-off control valve 38, is interposed between tank 14 and regulated vacuum source 34 to regulate the vacuum (pressure) in fixed volume tank 14.

Reference tank 12 is coupled by a conduit 27 to the output side of a three-way regulator valve 28, which has its two inputs respectively coupled to a vacuum source 30 and a pressure source 32. A pressure regulating arrangement 25 with regulator valve or second valve means 28 may select between either source 30, 32 to provide a fluid at the desired reference pressure in reference tank 12. A vacuum is defined as a pressure less than atmospheric pressure. In the case of reference tank 12 the fluid pressure is regulated to approximately 29.92 inches of mercury, referred to as standard atmospheric pressure. This fluid pressure is also applied to transducer 18 as a reference pressure. Pressure source 32 and vacuum sources 30 and 34 are known in the art and include devices such as pumps.

A delay valve 26 is mounted between the extensions 22, 24. The reference fluid pressure in reference tank 12 is provided through regulator 28 from either source 30 or 32. This fluid pressure is applied to and measured at absolute pressure transducer 20. At the same time a vacuum or reduced fluid pressure is applied to fixed volume tank 14 by vacuum source 34 through control valve 38, until a fluid pressure differential of a predetermined value exists between reference tank 12 and fixed volume tank 14, as indicated by differential pressure transducer 18. The time, as measured at timer 19, required to change from an initial fluid pressure to a final fluid pressure in fixed volume tank 14 thus determines the flow rate through valve 26. This time for this pressure change is referred to as bleed-down time.

The steps of the test method are:

(1) Mount a delay valve for test between the tanks 12, 14;

(2) Evacuate or pressurize reference tank 12 to a predetermined pressure;

(3) Evacuate fixed volume tank 14 such that a predetermined pressure differential is obtained between the tanks 12, 14; and (4) Using timer 19, measure the bleed-down time required to reach a final pressure (as measured by transducer 18) in fixed volume tank 14.

The direct measurement of the flow rate between reference tank 12 and fixed volume tank 14 through delay valve 26 is thus independent of variations in barometric pressure.

Using the described test method and apparatus 10 expedites the testing of delay valves, especially at a manufacturing pace. This expeditious testing is provided by timing flow under known, reproducible conditions subject neither to the vagaries of the environment nor the time constraint of calculating the flow rate as an approximation based upon the factors in an equation.

While this invention has been described in connection with a specific embodiment thereof, it is to be understood that this is by way of illustration and not by way of limitation; and the scope of the appended claims should be construed as broadly as the prior art will permit.

We claim:

1. A test stand assembly for testing a delay valve, comprising:

a first means enclosing a first fluid at a reference pressure;

a second means defining a known volume and enclosing a second fluid;

a pressure transducer connected between the first means and the second means;

a delay valve, connected in parallel with the pressure transducer between the first means and the second means for the testing of said valve; and first valve means, connected to the second means, for regulating the pressure of the second fluid, thus adjusting the pressure difference across the delay valve under test.

2. A test stand assembly for testing a delay valve as claimed in claim 1, wherein said reference pressure is atmospheric pressure at sea level.

3. A test stand assembly for testing a delay valve as claimed in claim 1, wherein said pressure transducer is a differential pressure transducer.

4. A test stand assembly for testing a delay valve as claimed in claim 1, wherein a second valve means is connected to the first means to regulate the pressure of the first fluid.

5. A test stand assembly for testing a delay valve as claimed in claim 1, wherein a pressure transducer is connected to the first means to monitor the absolute reference fluid pressure.

6. A test stand assembly for testing a delay valve as claimed in claim 1, wherein said pressure transducer is operatively connected to a time measurement apparatus.

7. A test stand assembly for testing a delay valve as claimed in claim 1, wherein said first valve means is a regulating valve operably connected between a vacuum or pressure pump and said second means.

8. A test stand assembly for testing a delay valve as claimed in claim 4, wherein said second valve means is a regulating valve positioned in a conduit connected between said first means and either a pressure source or a vacuum source, which sources are in parallel connection.

9. A method of testing a delay valve, comprising the steps of:

establishing a first fluid at a reference pressure;

providing a second fluid at an adjustable second pressure different from said reference pressure;

connecting a pressure transducer between the first and second fluids;

connecting the delay valve to be tested between the first and second fluids to permit fluid flow between said reference and adjustable pressure, which rate of fluid flow from an initial pressure to a predetermined final pressure of said second fluid is measured by said pressure transducer over a period of time.

10. A test stand assembly for testing a delay valve, which assembly comprises:

a first tank enclosing a first fluid maintained at a reference pressure;

an absolute pressure transducer connected to said first tank to indicate the reference pressure in said first tank;

a fluid pressure regulating arrangement coupled to said first tank, including a three-way regulator valve having its output connected to said first tank and its inputs respectively connected to a vacuum source and to a pressure source;

a second tank defining a fixed volume and enclosing a second fluid;

a differential pressure transducer connected between the first tank and second tank;

a timer coupled to said differential pressure transducer;

a delay valve, connected in parallel with the differential pressure transducer between the first tank and the second tank for the testing thereof;

a regulated vacuum source; and a control valve, connected between said regulated vacuum source and said second tank.

* * * * *